No. 690,059. Patented Dec. 31, 1901.
E. S. ISHAM, Jr.
REGISTERING METER.
(Application filed Nov. 6, 1901.)
(No Model.)
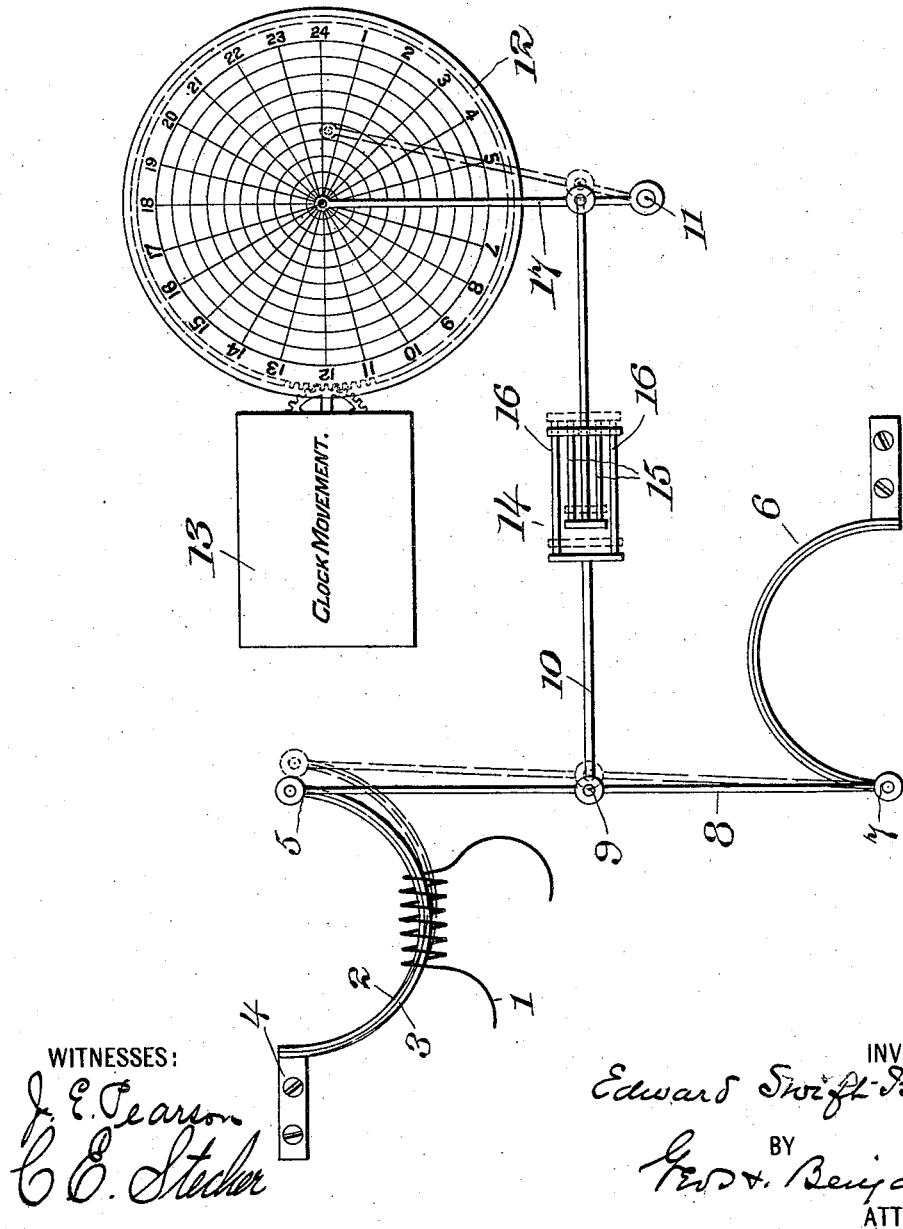
WITNESSES:
J. E. Pearson
C. E. Stecker
INVENTOR
Edward Swift Isham Jr.
BY
Geo. H. Benjamin
ATTORNEY

UNITED STATES PATENT OFFICE.

EDWARD SWIFT ISHAM, JR., OF NEW YORK, N. Y.

REGISTERING-METER.

SPECIFICATION forming part of Letters Patent No. 690,059, dated December 31, 1901.

Application filed November 6, 1901. Serial No. 81,353. (No model.)

*To all whom it may concern:*

Be it known that I, EDWARD SWIFT ISHAM, Jr., a citizen of the United States, residing at New York city, county and State of New York, have invented certain new and useful Improvements in Registering-Meters, of which the following is a specification.

My invention relates in general to meters, and more specifically consists of an improved form of meter for registering the consumption of electric current or other forms of energy developing heat by means of the expansion produced by such heat.

One difficulty which has been encountered heretofore in meters operated through the heat developed by the electric current or other energy has been that such meters are subject to great variations by reason of changes in the atmospheric temperature. I have overcome this difficulty by producing a meter in which all variations produced by atmospheric temperature are automatically corrected and only the variations produced by the heat of the electric current are recorded.

The preferred form of my invention is illustrated in somewhat diagrammatic form in the accompanying drawings.

The wire 1, formed into a coil or solenoid, represents a portion of an electric circuit through which the current to be measured or a definite fraction thereof is passed. This coil of wire is coiled about a thermostat or placed in operative relation thereto, so that the variations of the heat given off by the coil will cause the thermostat to expand and contract. As illustrated, the thermostat consists of two semicircular strips 2 and 3, the inner one of which is of some metal, as brass, which will expand and contract more rapidly under given variations in temperature than does the outer strip, which may be of steel. The curved thermostat is held rigidly at one end, as at 4, while the other end 5 is free to move in and out as the degree of curvature of the thermostat varies by reason of the unequal expansion and contraction of the strips 2 and 3. Another thermostat of similar construction 6 is oppositely arranged, so as to expand and contract in direct opposition to the first thermostat. To the free end 7 of the second thermostat is connected a link 8, the other end of which is pivoted to the free end 5 of the first thermostat. From an intermediate point 9 of said link extends the connection, as the rod 10, to an index or pointer 17. This index may be pivoted, as at 11, to a fixed pivot. The index coöperates with a moving dial 12 or an equivalent construction, on which are marked off lines representing different amounts of current and other lines at right angles thereto representing different periods of time. As shown, the dial is divided into twenty-four segments, representing the different hours of the day and night, and is rotated by any convenient clock-movement, (shown at 13.) In order to still further compensate for atmospheric variations, the rod 10 may have a compensating mechanism interposed between its extremities, such as is marked at 14 in the drawings, in which the expansion of the inner rods 15, which may be of brass, counteracts the opposite expansion of the rod 16, which may be of steel or iron.

The method of operation of my invention is as follows: Variations in the temperature cause the thermostats to expand in opposite directions, so that the extremities 5 and 7 of the link 8 practically revolve about the central point 9, and consequently no movement of the index is produced. The heat of the current flowing through the wire 1 produces an independent expansion and contraction of the first thermostat, however, which results in independent movement of the free end 5 thereof, which produces a movement of the link 8 about the point 7, as a fulcrum, as shown in broken lines. These movements of the link 8 produce corresponding movements of the index 17, with the result that a wavy line is traced on the dial 12, which shows the amount of current being consumed at every moment of the day and night.

The main advantage of my invention consists in eliminating all errors resulting from variations in the atmosphere of the room or the heating of the meter as a whole from external causes.

It is evident, of course, that various changes could be made in the construction described without departing from the spirit and scope of my invention. Other forms of thermostat might be substituted for those shown. Different means of connecting the thermostats with the index might be employed. Other forms of recording-surfaces might be used in place of the dial 12. The electric conductor might be differently arranged with reference to the thermostat and the apparatus might be employed for measuring heat developed by other means than that of an electric current. All such suggested modifications would, however, still be within the scope of my invention, so long as the principle of compensating for external temperature variations were retained.

Having therefore described my invention, what I claim as new, and desire to protect by Letters Patent, is—

1. The combination of two supporting-thermostats adapted to expand uniformly and in opposite directions under the influence of variations in atmospheric temperature, a link connecting these, an index operatively connected to an intermediate point in said link and means for applying a measurable quantity of heat to one of said thermostats.

2. The combination of two supporting-thermostats adapted to expand uniformly and in opposite directions under the influence of variations in atmospheric temperature, a link connecting these, an index operatively connected to an intermediate point in said link and means for applying a measurable quantity of heat to one of said thermostats, together with temperature-compensating means interposed in the connections to the index.

3. The combination of two supporting-thermostats adapted to expand at the same rate and in opposite directions, a link connected at either end to the thermostats, an index operatively connected to a point in the link midway between its connections to the thermostats, and an electric heating-coil arranged in operative relation to one of the thermostats.

4. The combination of two supporting-thermostats adapted to expand uniformly and in opposite directions under the influence of variations in atmospheric temperature, a link connecting these, an index operatively connected to an intermediate point in said link and means for applying a measurable quantity of heat to one of said thermostats, together with a recording-dial adapted to co-operate with said index and clockwork mechanism for rotating said dial.

In testimony whereof I affix my signature in the presence of two witnesses.

EDWARD SWIFT ISHAM, Jr.

Witnesses:
J. E. PEARSON,
C. E. STECHER.